Feb. 16, 1960    G. C. PFAFF, JR., ET AL    2,925,231
BOUNDARY LAYER REMOVAL STRUCTURE
Filed Feb. 29, 1956
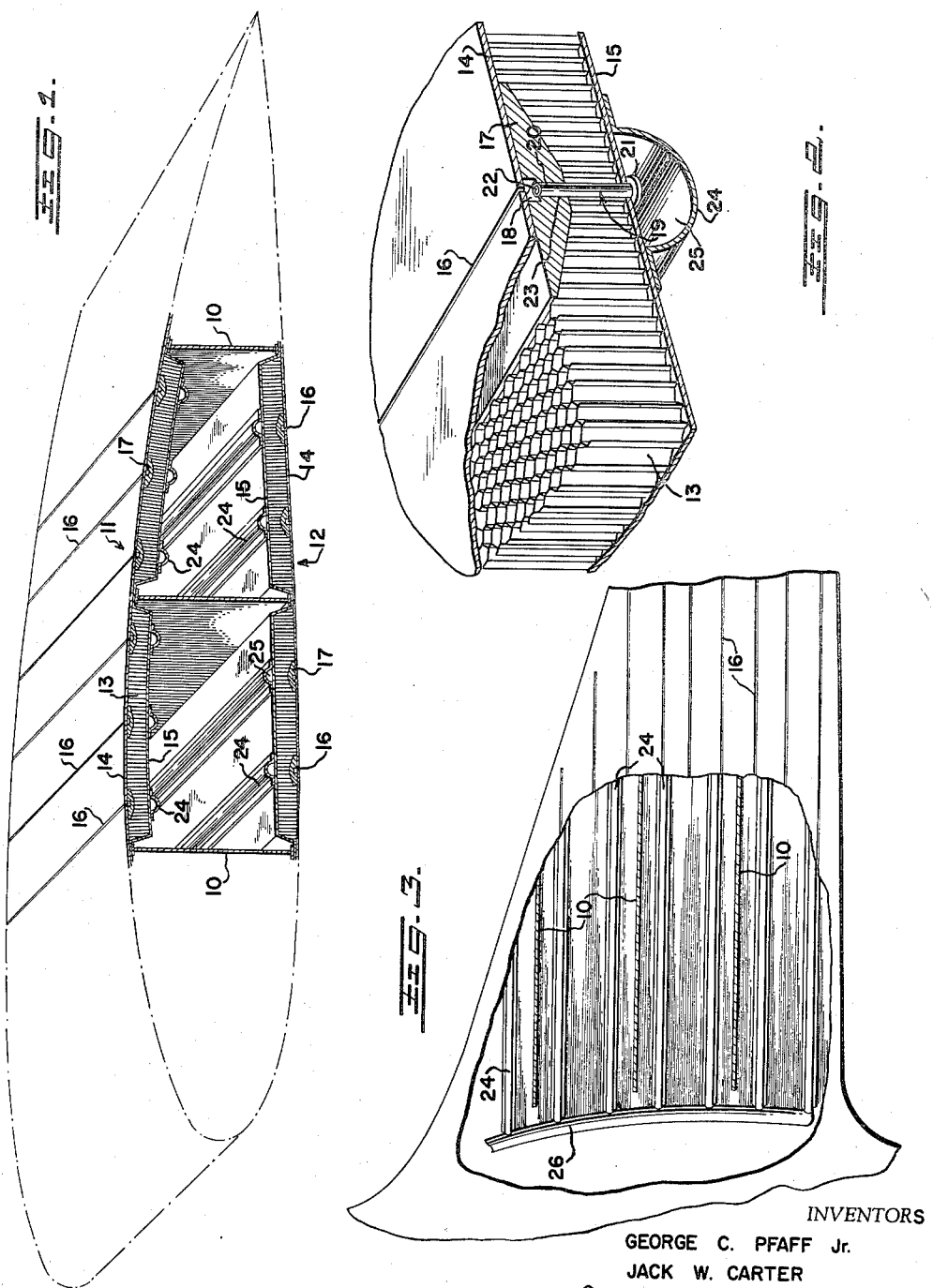
INVENTORS
GEORGE C. PFAFF Jr.
JACK W. CARTER
BY *Julian C. Renfro*
ATTORNEY United States Patent Office 2,925,231
Patented Feb. 16, 1960

2,925,231

BOUNDARY LAYER REMOVAL STRUCTURE

George C. Pfaff, Baltimore, Md., and Jack W. Carter, Towson, Md., assignors to The Martin Company, a corporation of Maryland Application February 29, 1956, Serial No. 568,570

14 Claims. (Cl. 244—42)

This invention relates to the removal of the boundary layer of air from aircraft surfaces, and particularly to an aircraft structural member, such as a wing or fuselage formed of sandwich honeycomb material, and having means for removing the boundary layer of air from the external surfaces thereof.

It has heretofore been proposed to suck off a portion of the boundary layer air from the external surfaces of the airplane wings in order to achieve laminar flow, and thereby to effect a decrease in the drag due to skin friction.

When spanwise slots formed in the external surfaces of a wing are utilized to remove the boundary layer, the structural continuity of the wing surface is destroyed, thus decreasing the capacity of the wing to take loads and shears. In the past it has been necessary to rivet bridging members across these slots to restore the structural strength of the wing surface, but such a means not only is weighty but also is expensive for the standpoint of manufacturing.

According to this invention, an airplane structural member, such as a wing, tail surface, flap or fuselage, is formed of honeycomb material consisting of a cellular core with inner and outer surface sheets secured to the opposite sides thereof, with spanwise slots formed in its outer surface sheet for the removal of the boundary layer air. Lightweight bridging members are secured to the inner side of the outer surface sheet on both sides of the slot and to the honeycomb core and add only small additional weight to the structural member. The honeycomb core is secured to the inner side of the surface sheet on both sides of the spanwise slots, and extends across the slots. The effect of the bridging member extending across the spanwise slots is to strengthen the structural member and to compensate for the decrease in strength caused by the formation of the slots in the surface sheet.

The outer surface sheets are adhesively or otherwise secured to the cellular core in such manner as to leave the outer sides of the surface sheets free from protrusions which would interfere with or retard the flow of air over the surface. Such honeycomb sandwich material has the advantages of great strength, light weight, and a smooth surface free from rivets or other projections. These characteristics make the material especially suitable for formation into airplane members. Airplane wings formed of the honeycomb sandwich material are light, strong, and have a wrinkle-free, dent-free, rigid surface.

The invention also provides a novel means for conducting air withdrawn from the boundary layer through the slots, through the honeycomb core, and into ducts that carry the boundary layer air to an appropriate discharge. To this end, the bridging member is provided with a groove extending opposite the control slots at the inner sides of the surface sheets, and conduits, which may take the form of hollow rivets, extend through the core, and have their respective ends in communication with the grooves and the ducts which are attached to the other surface sheet of the honeycomb sandwich material. Thus, the bridging member accomplishes the twofold result of, first, strengthening the structural member by attachment to the surface sheet on both sides of the slot, and, secondly, providing a groove which serves as a branch manifold passageway for the removal of boundary layer air.

An embodiment of the invention is illustrated in the accompanying drawings. However, it is to be understood that such further disclosure is by way of exemplification and the invention is not limited thereby, but only by the scope of the subjoined claims.

In the drawings:

Fig. 1 is a sectional perspective view of a portion of an airplane wing embodying the invention;

Fig. 2 is an enlarged perspective cross-sectional view of a section of the airplane wing shown in Fig. 1; and Fig. 3 is a top view of the root section of the airplane wing shown in Fig. 1, with a portion of the upper layer of the wing cut away to show the main manifold at the root of the wing through which air withdrawn from the boundary layer may be discharged.

Fig. 1 is shown an airplane wing having an inner framework 10 that forms a supporting structure for the surface material of the wing. This surface material comprises top and bottom layers 11 and 12 of honeycomb sandwich material. Each of these layers is constructed utilizing a cellular core that is formed of strips that are bonded or otherwise secured together at spaced intervals in such a manner as to form a plurality of cells. This core can be either of the "expanded cell" type, or else of the "preformed cell" type. Outer and inner surface sheets 14 and 15 are secured on both sides of the core, as best seen in Fig. 2, so as to form a so-called "sandwich." The strips utilized in the construction of the core are preferably of metal, but could be of resin-impregnated fabric. The surface sheets are preferably of aluminum, magnesium, titanium, steel, or the known alloys of these metals.

Typically, when the surface sheets are made of the lighter metals such as aluminum or magnesium, and the core, also, is made of these metals, or of resin-impregnated fabric, the strips constituting the core are bonded together by the use of a suitable structural adhesive, and the surface sheets are secured to the core by the same means. The bonding technique will be referred to in greater detail hereinafter.

When the surface sheets and the core are made of steel, titanium, or alloys of these metals, welding or brazing techniques are preferably used in place of adhesive bonding so that full use may be made of the ability of these metals to withstand operation at elevated temperatures. For instance, in the case of corrugated strips of stainless steel that are to be secured together to form the "preformed cell" type of core, the abutting valleys and crests of the corrugated strips might be secured together by resistance welding. The surface sheets, which typically would be of the same or similar metal, would preferably be secured to this core by means of brazing or resistance welding.

All of the aforegoing techniques of constructing the honeycomb sandwich material permit an aircraft wing, for instance, to be constructed so as to have smooth, dent-free exterior surfaces. As shown in the drawing, sheets 14 form the upper surface of top layer 11 and the lower surface of bottom layer 12. Similarly, sheets 15 form the lower surface of top layer 11 and the upper surface of bottom layer 12. The surface sheets 14 and 15 may have a thickness determined by the use intended for the structural element, and when the structural element is to form an airplane wing, the thickness of the surface sheets may range from about 0.008 inch to about 0.250 inch. Such honeycomb sandwich material is of well known construction and is disclosed, for example, in the patents to Merriman No. 2,608,502; Pajak No. 2,609,068 and Engel et al. No. 2,609,314.

Slots 16 through which the boundary layers of air immediately adjacent the wing surface may be removed, are formed in the outer surface sheets 14, both in the upper surface of top layer 11 and in the lower surface of bottom layer 12, and run spanwise of the wing illustrated in Fig. 1. The slots may be continuous for substantially the full span of the wing, or for any desired part thereof and, if desired, they may be interrupted with connecting portions of the outer surface sheets extending integrally between the ends of the slots. The width of the slots will depend on the volume of boundary layer air it is desired to remove, and preferably will be within the range of from about 0.005 inch to about 0.250 inch, or possibly somewhat larger, with about 0.010 inch being preferred.

A bridging member 17, which may be an aluminum extrusion, is mounted on the inner side of each outer surface sheet 14 opposite each of the slots 16. The members 17 bridge the slots, extend longitudinally, or spanwise of the wing, and are substantially coterminous with the slots 16. The bridging members 17 are adhesively secured to the inner sides of the outer surface sheets 14 on both sides of each slot 16. The bridging members are also adhesively secured to the honeycomb cores 13. The bridging members 17 are shaped to provide grooves 18 which extend spanwise coterminously with the slot 16, and, as shown in Fig. 2, are positioned immediately inwardly of the slots for the collection of air from the boundary layer which is drawn through slots 16. Conduits in the form of pull-through rivets 19 extend through the bridging members and the cores 13 and are spaced along the span of the wing in communication with grooves 18. Each rivet 19 has a shank 20, a widened head 21 engaging the inner surface sheet 15 of the honeycomb sandwich material, and a central passage 22.

The construction of the rivets and the method of installing them are well known. Each rivet is provided with an expanding tool (not shown) extending through the central passage 22 and having an enlarged head at the end which protrudes beyond the shank. The rivets 19, with the expanding tools therein, are placed in holes 23 previously drilled through inner surface sheet 15, core 13, and the lower portion of the bridging member 17. Thereafter, each expanding tool is withdrawn through the central passage 22 while its associated rivet 19 is held stationary. This causes the head of the tool to expand the shank 20 of rivet 19 laterally and to force it into very tight frictional engagement with the bridging member 17, the core 13, and the inner surface sheet 15. A structure is thus formed wherein the passages 22 communicate with the groove 18 in the bridging member 17.

Ducts 24, which may be formed of aluminum metal, extend spanwise of the wing and are bonded, preferably by adhesive, to the inner surface sheets 15. The ducts extend parallel to the slots 16 and are positioned opposite the inner ends of the rivets 19 and form, in combination with inner surface sheets 15, passages 25 communicating with rivet passages 22. The ducts 24 lead into a manifold 26 located at the root of the airplane wing. A source of suction (not shown) applies suction to the manifold 26. The suction may be developed by a fan, pump, or, in jet propelled aircraft, by a turbine-driven compressor. By adhesively bonding the duct 24 to the surface sheet 15, a passage is formed which is more gas tight than if riveting is employed.

By supplying suction through passage 25, to the spaced rivet passages 22, a more uniform distribution of suction along the span of the wing is obtained than if the suction were supplied directly to the ends of the continuous grooves 18, since, if the suction were applied directly to the ends of the grooves 18, there would be intense suction near their ends at the root of the wing, with little or no suction toward the wing tip.

When an adhesive is used in assembling the structural member, a thermosetting resinous adhesive is preferred. In the embodiment illustrated, the corrugated sections of the honeycomb core 13 are bonded together by means of any acceptable structural adhesive to form the cellular honeycomb core material. This adhesive can be FM-47, a vinyl phenol formaldehyde type of structural adhesive. This adhesive may also be used to bond the surface sheets 14 and 15 to the cores 13, the bridging members 17 to the outer surface sheets 14 and to the cores 13, and the ducts 24 to the inner surface sheets 15.

When it is desired to suck off the boundary layer air which lies about the outer surface sheets 14 of the airplane wing, suction is applied to the manifolds 26, to cause the boundary layer air to be withdrawn through the slots 16 into grooves 18, and to pass, via passages 22 in rivets 19, through passages 25 formed by ducts 24, to manifolds 26, whence it is led to exhaust.

From the foregoing, it will be seen that the invention combines the advantages of boundary layer removal with the lightweight strength of honeycomb sandwich material, to yield a light, strong, efficient aircraft structural member having a smooth outer surface, and wherein bridging members and the core of the honeycomb material combine to compensate for the decrease in strength caused by the boundary layer removal slots.

While the invention has been illustrated in a specific embodiment, changes and variation in the construction of the member may be made without departing from the scope of the invention or sacrificing any of the advantages thereof. It is also to be understood that the invention is applicable for the removal of a boundary layer wherever such a boundary layer is formed under conditions similar to those existing in connection with airplane wings.

We claim:

1. An aircraft structural member having means for removing boundary layer air therefrom comprising a honeycomb core, surface sheets attached to opposite sides of said core, one of said surface sheets forming at least a portion of an outer surface of the structural member over which the air flows when the aircraft is in motion, said one surface sheet having at least one slot therein through which boundary layer air may be withdrawn, and a bridging member extending across said slot and secured to the inner side of said one surface sheet on both sides of said slot, said bridging member incorporating therein conduit means extending lengthwise of the slot and communicating therewith, whereby upon the application of suction to said conduit means, boundary layer air will be withdrawn through said slot.

2. An aircraft structural member according to claim 1, wherein said conduit means is a groove in the bridging member contiguous with said slot.

3. An aircraft structural member according to claim 1, wherein said bridging member is secured to said one surface sheet with an adhesive.

4. An aircraft structural member having means for removing boundary layer air therefrom comprising a honeycomb core, surface sheets attached to opposite sides of said core, one of said surface sheets forming at least a portion of an outer surface of the structural member over which the air flows when the aircraft is in motion, said one surface sheet having at least one slot therein through which boundary layer air may be withdrawn, a bridging member extending across said slot and secured to the inner side of said one surface sheet on both sides of said slot, said bridging member incorporating therein conduit means extending lengthwise of the slot and communicating therewith, a duct extending along the other surface sheet, and conduit means connecting said first-named conduit means with said duct, whereby upon the application of suction to said duct boundary layer air will be withdrawn through said slot.

5. An aircraft structural member according to claim 4, in which said bridging member has a groove therein contiguous with said slot, thereby defining said conduit means.

6. An aircraft structural member having means for removing boundary layer air therefrom comprising a honeycomb cellular core, surface sheets attached to opposite sides of said core, one of said surface sheets forming at least a portion of an outer surface of the structural member over which the air flows when the aircraft is in motion, said one surface sheet having a slot therein through which boundary layer air may be withdrawn, a bridging member extending across said slot and secured to the inner side of said surface sheet on both sides of said slot, said bridging member having a groove contiguous with said slot, a duct extending substantially parallel to said slot, and conduit means extending through said core and having its respective ends in communication with said groove and said duct.

7. An aircraft structural member according to claim 6, wherein said conduit means includes at least one hollow rivet frictionally engaging said bridging member.

8. An aircraft structural member having means for removing the boundary layer air therefrom comprising a honeycomb cellular core, surface sheets attached to opposite sides of said core, one of said surface sheets forming at least a portion of an outer surface of the structural member over which the air flows when the aircraft is in motion, said surface sheet having a longitudinal slot therein through which boundary layer air may be withdrawn, a bridging member extending substantially parallel to and across said slot and being secured to the inner side of said surface sheet on both sides of said slot, said bridging member being secured to said core and having a groove contiguous with said slot and extending substantially coterminously therewith, a duct extending substantially parallel to said slot and attached to a portion of the other of said surface sheets, and a plurality of longitudinally-spaced conduits extending through said core, each conduit having its respective ends in communication with said groove and said duct.

9. An aircraft structural member according to claim 8, wherein said duct extends along the other surface sheet at the side of said core remote from said slotted surface sheet.

10. An aircraft structural member according to claim 8, wherein said bridging member is secured to said one surface sheet and to said core with an adhesive, and said duct is secured to said other surface sheet with an adhesive.

11. An airplane wing having means for removing boundary layer air therefrom formed of upper and lower layers of honeycomb sandwich material, an outer surface sheet of said honeycomb sandwich material having a slot therein extending substantially spanwise, through which boundary layer air may be withdrawn, a bridging member extending lengthwise along said slot and across said slot and being secured to the side opposite the exposed side of said outer surface sheet on both sides of said slot, said bridging member having a groove extending the length of and being contiguous with said slot, a duct extending substantially parallel to said slot and attached to a portion of said wing, and conduit means extending through said core and having its respective ends in communication with said slot and said duct.

12. An airplane wing according to claim 11, wherein said duct extends along the interior side of the respective sandwich honeycomb layer.

13. An airplane wing according to claim 12, wherein said duct is secured with an adhesive, and said bridging member is secured to said outer surface sheet with an adhesive.

14. An airplane wing according to claim 11, wherein said conduit means are hollow rivets frictionally engaging said bridging member.

References Cited in the file of this patent

UNITED STATES PATENTS

| | | |
|---|---|---|
| 2,742,247 | Lachmann | Apr. 17, 1956 |

FOREIGN PATENTS

| | | |
|---|---|---|
| 718,421 | Great Britain | Nov. 17, 1954 |